UNITED STATES PATENT OFFICE.

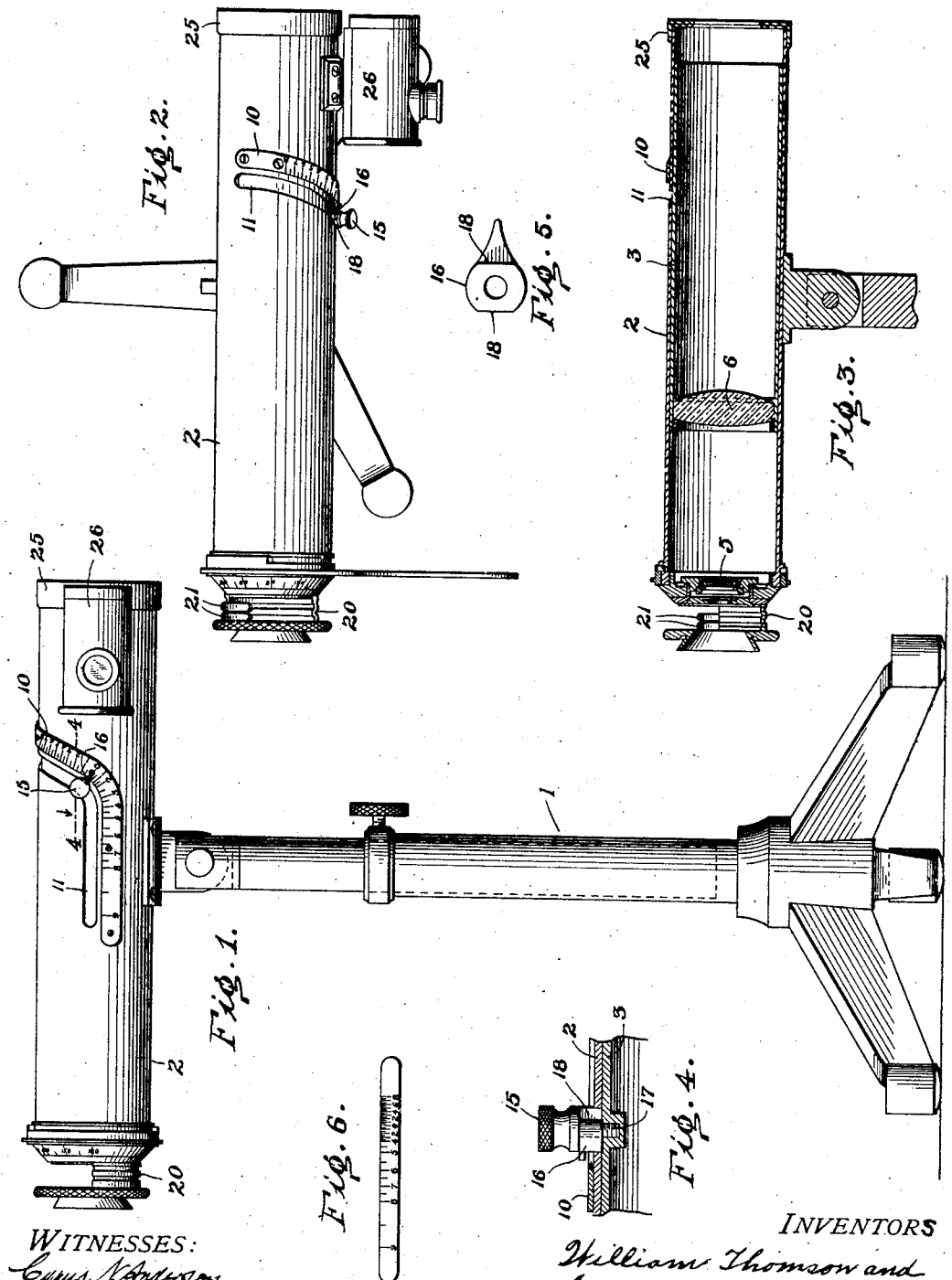

WILLIAM THOMSON AND ARCHIBALD G. THOMSON, OF PHILADELPHIA, PENNSYLVANIA, ASSIGNORS TO FOX OPTICAL MANUFACTURING COMPANY, OF PHILADELPHIA, PENNSYLVANIA, A CORPORATION OF NEW JERSEY.

OPTOMETER.

No. 843,503.     Specification of Letters Patent.     Patented Feb. 5, 1907.

Application filed March 6, 1906. Serial No. 304,520.

*To all whom it may concern:*

Be it known that we, WILLIAM THOMSON and ARCHIBALD G. THOMSON, citizens of the United States, residing in the city and county of Philadelphia, State of Pennsylvania, have invented certain new and useful Improvements in Optometers, of which the following is a specification.

Our invention relates to improvements in optometers, in which a plurality of lenses are employed, one at least of which is the eye lens and another of which is the object lens. The said lenses are movable relatively to each other. In practical use, the lenses are moved relatively to each other to different positions suitable to the vision of a person whose eyes are being examined, so that the refraction of an eye or the eyes may be determined.

It is also found that as the glasses are separated, the distances of separation necessary to change the focal points from one dioptric to another decreases very rapidly, so that it is impracticable to indicate by divisions upon a straight scale the changes in dioptrics by reason of the fact that if the scale were straight, the divisions would be so close together that it would be difficult to distinguish them.

It is one of the objects of our invention to provide means whereby a scale may be placed either upon or in proximity to the tube in which the lenses are mounted, so that a pointer or indicator movable with one of the lenses may travel along the said scale to indicate the relative positions in dioptrics of the said lenses. In the construction shown, the scale is located upon the tube in which the lenses are carried.

We have also provided means connected to the tube in which the said lenses are mounted or carried for holding an additional eye piece or pieces, or a lens or lenses. The said additional lens holding means is situated at the end of the tube adjacent to the eye lens and is adapted to receive a lens which may be interposed between the said eye lens and the eye of the observer.

In order that our invention may be more readily understood, reference is to be had to the accompanying drawings, in which, Figure 1 is a side elevation of an optometer provided with my invention;

Figure 2 is a plan view of the same;

Figure 3 is a longitudinal, vertical section of an optometer provided with my invention;

Figure 4 is a section on the line 4-4 of Figure 1;

Figure 5 is a bottom plan view of the indicator, which is movable with one of the lenses; and Figure 6 is a straight scale containing the same number of divisions as the curved scale shown in Figure 1 of the drawings.

In the drawings, 1 designates a pedestal or standard upon which the optometer is pivotally supported or carried. 2 designates an outer lens carrying or holding tube and 3 designates an inner concentric tube in which the movable lens is mounted. The outer tube 2 is provided at one end with an eye lens 5 which is a diverging or concaved lens. The lens which is illustrated is double concaved, though not necessarily so, as any form of negative lens may be employed. The lens 6 carried by the tube 3 is a condensing lens and may be, as illustrated, a double convex lens, though not of necessity so, as any form of condensing lens may be employed. The tube 3 in which the lens 6 is carried is revoluble within the tube 2 and is also movable longitudinally therein, so that the said lens 6 may be moved toward and from the eye lens 5, the same as is the case of the object lenses of opera glasses. It is known that the distances through which it is necessary to move the lens to change from one dioptric to another varies with the position of the said lenses with respect to each other. When the lenses are close together, the amount of separation necessary to occasion a change from one dioptric to another is greater than when the lenses are separated a greater distance.

By reason of this fact, it is necessary to provide some special construction to indicate in dioptrics, or fractions thereof, the refraction of a lens. The construction which we have provided for this purpose consists of a bent or crooked scale 10 located adjacent to a bent or crooked slot 11 in the outer tube 2, which slot lies adjacent to the said scale. In the construction illustrated, the scale consists of a strip or plate secured to the tube 2 and having the divisions of the scale thereon, but, if desired, the scale may be formed upon the tube 2 by placing the divisions of the scale directly thereon.

It will be observed that both the scale and the slot at their ends nearest to the eye lens 5 are substantially straight and that they extend longitudinally of the lens carrying tube, and that the portions of the said scale and slot further away from the said eye lens 5 extend transversely of the tube 2.

It will be noted also that the straight portions of the scale and slot which extend longitudinally of the lens carrying tube and the portions thereof which extend transversely of the said tube are connected or joined to each other by means of curvilinear portions, although such connecting portions are not necessarily curved as the longitudinal and transversely extending portions may be joined directly together without the intervention of a curvilinear portion.

In the construction illustrated, the scale and the slot are arranged in parallel relation to each other, but they need not necessarily be so related. The position of the division marks upon the scale 10 have been determined experimentally.

It is obvious that by bending the scale in the manner indicated, the division lines thereupon may be placed a greater distance apart corresponding to the different positions of the condensing lens 6 in changing from one dioptric or fraction thereof to another, than if the said scale were straight; that is, if the entire length of the scale extended in substantially straight lines longitudinally of the lens carrying or holding tube 2.

When the movable lens 6 is moved outward from the position which it occupied when nearest to the eye lens 5, it approaches a position of neutralization, in which position the rays of light passing through from either lens through the other lens emerge therefrom in parallel lines or rays. This position is indicated upon the scale by a zero mark.

To determine the refraction of a myoptic eye, the movable lens is moved to different positions upon the left hand side of a point of neutralization, and to determine the refraction of a hypermetropic eye, the lens is moved to different positions upon the right hand side of said point of neutralization.

We have provided the thumb screw 15, shown in Figures 1, 2 and 4, as a means for moving the inner tube 3 carrying the lens 6 in and out within the tube 2. This thumb screw 15 is screwed into the inner tube 3 and extends out through the slot 11, as shown in the drawings.

16 designates an indicator or pointer which is loosely mounted upon the reduced portion 17 of the thumb screw 15. It will be observed that this indicator is adapted to be moved back and forth in the crooked or bent slot 11, and that it is provided with the flat sides or surfaces 18, which rest against the opposite sides of the said slot 11. By reason of the presence of these flat surfaces, the indicator 16 is turned about the axis of the thumb screw 15 so that the point of the said indicator points directly across or at right angles to the scale in each and every position in which the said indicator may be placed.

20 designates an eye piece or a lens holder provided at the same end of the tube 2 as the eye lens 5. This additional eye piece or lens holder is adapted to receive an eye piece or a lens or lenses of any character which it is desired to use and which are of the proper dimensions to be placed in the said holder. Such eye pieces or lenses are held in position by means of the spring fingers or clips 21. One form of eye piece which may be located in this additional holder consists of two portions of glass arranged in abutting relation and which portions may be either integral or separated, one of which portions is or may be ruby colored and the other portion thereof consists or may consist of a segment of a cylinder.

In order to prevent too much light from entering the tubes 2 and 3, we have provided a diaphragm 25 which is adapted to be placed over the outer end of the tube 2, as shown in the drawings. This diaphragm may be of any construction desired. 26 indicates a finder which may be of any suitable construction. The construction of this finder constitutes no part of our invention and therefore is not shown in detail.

It will be understood that our invention may be employed in any form of construction in which the lenses are relatively movable and that it may be employed upon the separate tubes of a binocular form of construction, except that upon the tube for the left eye, the curved portion of the slot and the scale should extend in a direction opposite to that shown in the drawings. The construction, however, upon each of the tubes in said binocular form would be identical.

Having thus described our invention, we claim—

1. In a device of the character described, the combination of a tube carrying an eye lens, a movable tube located within the first mentioned tube, an object lens located in the said movable tube, a crooked slot provided in the first mentioned tube, a scale located upon the said first mentioned tube adjacent to the said slot, and an indicator or pointer connected to the said movable tube, the said indicator or pointer being movable to different position, within the said slot, and cooperating with the said scale to indicate the position of the movable tube.

2. In a device of the character described, a lens carrying tube provided with a slot, one portion of which extends longitudinally of the said tube, and another portion of which extends transversely thereof, a scale located upon the said tube, a movable lens located within the said tube, and an indicator or pointer connected to the said lens and being located within the said slot and adapted to be moved to different positions therein.

3. In a device of the character described, a lens carrying tube provided with a slot having portions which are angularly related with respect to each other, a scale located adjacent to the said slot and in parallel relation thereto, a movable lens within the said tube, and an indicator connected to the said lens, the said indicator being movable to different positions within the said slot and co-operating with the said scale to indicate at any moment the position of the said lens.

4. In a device of the character described, a tube, a crooked slot provided in the said tube, a scale upon the said tube adjacent to the said slot, a movable lens located in the said tube, an indicator connected to the said lens and located in the said slot and adapted to be moved to different positions therein, the said indicator being provided with opposite flat or plain surfaces which are adapted to contact with the opposite edges of the said slot, whereby when the said indicator is moved from one portion of the said slot to another, rotation about its axis may be occasioned.

5. In a device of the character described, a lens carrying tube provided with a slot, one portion of which extends longitudinally of the said tube, and another portion of which extends transversely of the said tube, and a scale located adjacent to and parallel with the said slot.

6. In a device of the character described, a lens carrying tube provided with a slot, one portion of which extends longitudinally of the said tube, another portion of which extends transversely of the said tube, and the said two portions being connected together by means of an intermediate curved portion, and a scale located adjacent to and parallel with the said several portions of the slot.

7. In a device of the character described, a lens carrying tube provided with a slot, one portion of which extends longitudinally of the said tube, another portion of which extends transversely thereof, a movable lens within the said tube, and an indicator or pointer connected to the said lens and movable within the said slot and co-operating with the said scale to indicate the position of the lens.

In testimony that we claim the foregoing as our invention we have hereunto signed our names this 28th day of February, A. D. 1906.

WM. THOMSON.
ARCHIBALD G. THOMSON.

In presence of—
LEWIS JENKINS,
HARRY F. AMBLER.